United States Patent
Xu et al.

(10) Patent No.: US 6,925,873 B2
(45) Date of Patent: Aug. 9, 2005

(54) LIQUID HELIUM LEVEL SENSOR FOR USE IN A CRYOGENIC ENVIRONMENT AND METHOD FOR ASSEMBLING SAME

(75) Inventors: Minfeng Xu, Florence, SC (US); Weijun Shen, Florence, SC (US); Stephen R. Elgin, Florence, SC (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 10/439,395

(22) Filed: May 16, 2003

(65) Prior Publication Data

US 2004/0226364 A1 Nov. 18, 2004

(51) Int. Cl.$^7$ ............................................. G01F 23/00
(52) U.S. Cl. ............................... 73/304 R; 73/290 R
(58) Field of Search ........................... 73/304 R, 290 R

(56) References Cited

U.S. PATENT DOCUMENTS

| | | | | |
|---|---|---|---|---|
| 3,943,767 A | * | 3/1976 | Efferson | ...................... 73/295 |
| 4,944,183 A | | 7/1990 | Masumoto et al. | |
| 5,114,907 A | * | 5/1992 | Erwin et al. | ................. 505/160 |
| 5,167,153 A | * | 12/1992 | McQueen | ..................... 73/295 |
| 5,355,727 A | * | 10/1994 | McQueen | ................ 73/204.25 |
| 5,393,736 A | * | 2/1995 | Hodge et al. | .................. 73/295 |
| 5,432,666 A | * | 7/1995 | Hodge | .......................... 361/19 |
| 5,744,945 A | * | 4/1998 | Hodge et al. | ............... 324/71.6 |
| 2003/0177826 A1 | * | 9/2003 | Adkadkam et al. | ........ 73/304 C |

FOREIGN PATENT DOCUMENTS

| | | |
|---|---|---|
| GB | 1096025 | 12/1967 |
| JP | 2000275085 A | 10/2000 |
| SU | 1501684 A | 7/1994 |

* cited by examiner

Primary Examiner—Herzon Williams
Assistant Examiner—Rodney Frank
(74) Attorney, Agent, or Firm—Joseph S. Heino; Patrick M. Bergin; Henry Policinski

(57) ABSTRACT

The present invention provides a method and apparatus for measuring the level of a liquid cryogen. The invention provides for use of a current source (52), a length, or multiple lengths, of superconducting filament (40) situated within a cryostat (1) containing a cryogenic fluid (2) and a voltmeter (51) for measuring the voltage drop across the filament (40). The invention further provides a method for using said apparatus.

20 Claims, 3 Drawing Sheets

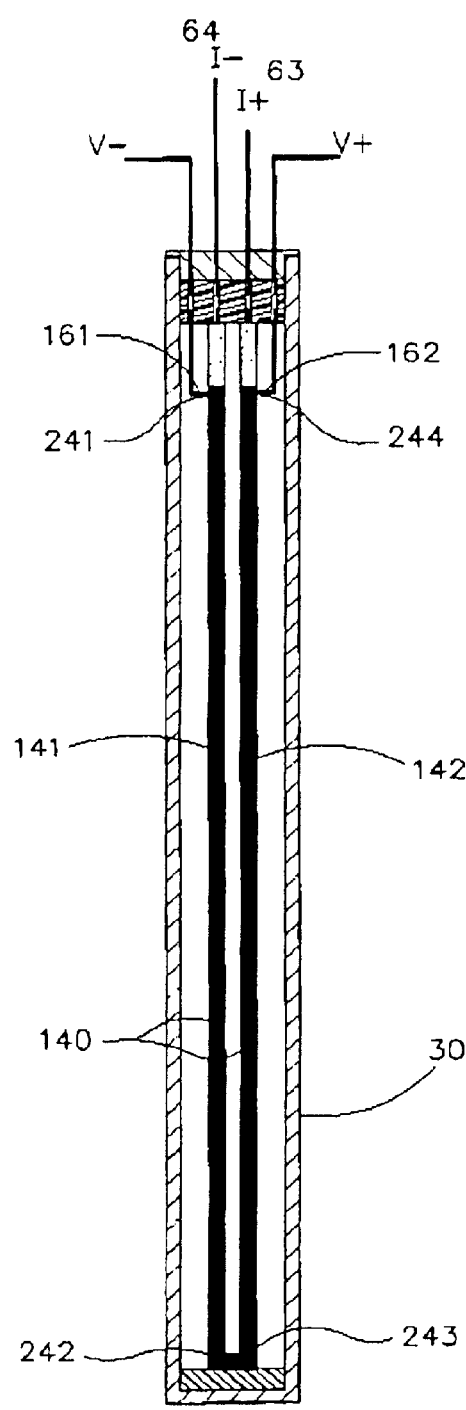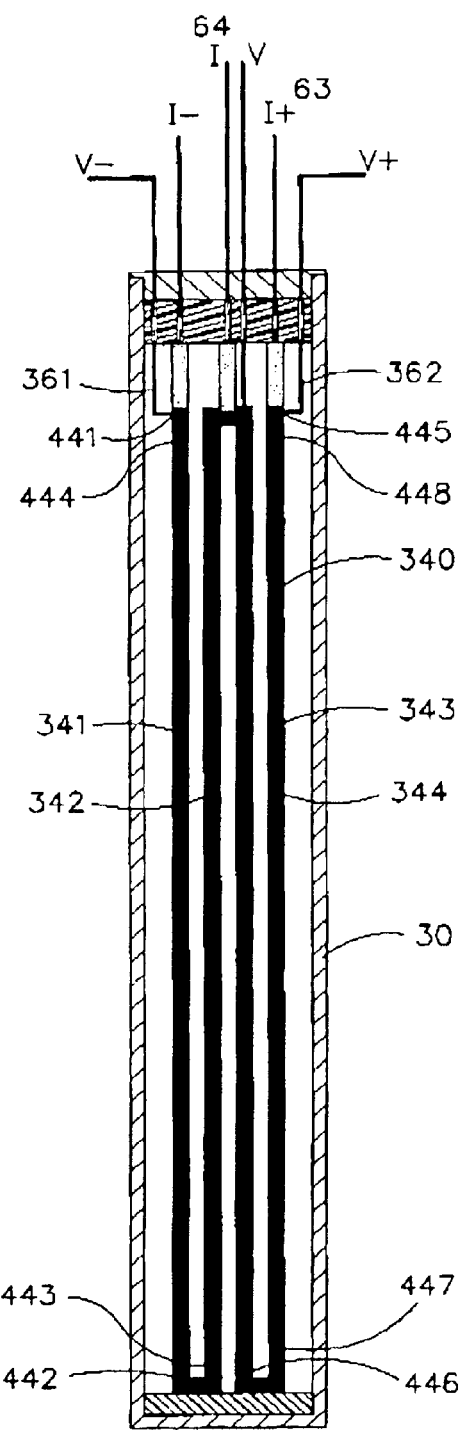
FIG. 3
FIG. 4

LIQUID HELIUM LEVEL SENSOR FOR USE IN A CRYOGENIC ENVIRONMENT AND METHOD FOR ASSEMBLING SAME

BACKGROUND OF THE INVENTION

This invention relates to methods and devices used to measure the liquid levels in a cryogenic environment. More specifically, the invention relates to a new and improved method and apparatus for assembling a liquid helium level sensor that is used for measuring the liquid helium level in a cryogenic cooler.

Commonly used liquid helium sensors employ a string of superconducting NbTi filament in either rigid or flexible tubing. Generally, filament sizes range from 0.0005 inch to 0.002 inch in diameter. The sensor operates by measuring the resistance of the portion of the superconductor filament that is above the liquid helium level. The portion that is submerged in the liquid will not contribute measurable resistance because it is in the superconducting state at the temperature of liquid helium. Very thin NbTi filament is employed so that the resistance generated by that portion of the filament above the liquid helium surface produces a measurable voltage drop across the entire filament even with a current as small as 50 mA to 100 mA. The liquid helium level is then inversely proportional to the voltage drop measured, given a constant excitation current.

In general, the sensitivity and accuracy of the sensor increases as the resistance of the superconducting filament increases. Normally, there are two ways to increase the resistivity of the filament. The first way is to reduce the diameter of the filament. The second method involves etching off the copper matrix from the NbTi—Cu filament, because copper has very low resistivity.

In practice, very thin filament is difficult to handle, easy to break and is so thin that is extremely difficult to manufacture. Also, very thin filament size reduces the current carrying capacity of the superconducting filament, thus reducing the voltage output. This causes a reduction of the signal to noise ratio and reduces the accuracy of the measuring device.

BRIEF SUMMARY OF THE INVENTION

The present invention provides a novel technique for assembling superconducting filaments and heaters to form a single object for use as a cryogenic fluid indicator in a cryogenic environment. The present invention provides a high degree of sensitivity and reliability in comparison to previous methods.

The present invention provides a thicker NbTi filament that is connected in series to increase the output voltage. Increasing the output voltage increases the sensitivity to changes in the level of liquid helium and improves the accuracy for measuring the voltage drop. The present invention can also be modified from a single filament level sensor to a multiple filament level sensor by a relatively simple change in the connection scheme.

The present invention provides better sensitivity to the liquid helium level due to the longer resistive filament. The present invention also achieves better accuracy because of the higher resistance of the filament used in the present invention. The present invention is also more reliable than previous methods because larger diameter filament can be used. Lastly, manufacturing a very thin filament presents a high probability of breakage during the manufacturing process. Therefore, using a thicker filament reduces this risk and the cost associated with the manufacturing process.

BRIEF DESCRIPTION OF THE DRAWINGS

FIG. 3 is a schematic showing the liquid helium level sensor of the present invention.

FIG. 4 is another schematic showing another embodiment of the present invention.

DETAILED DESCRIPTION

Figure 1:
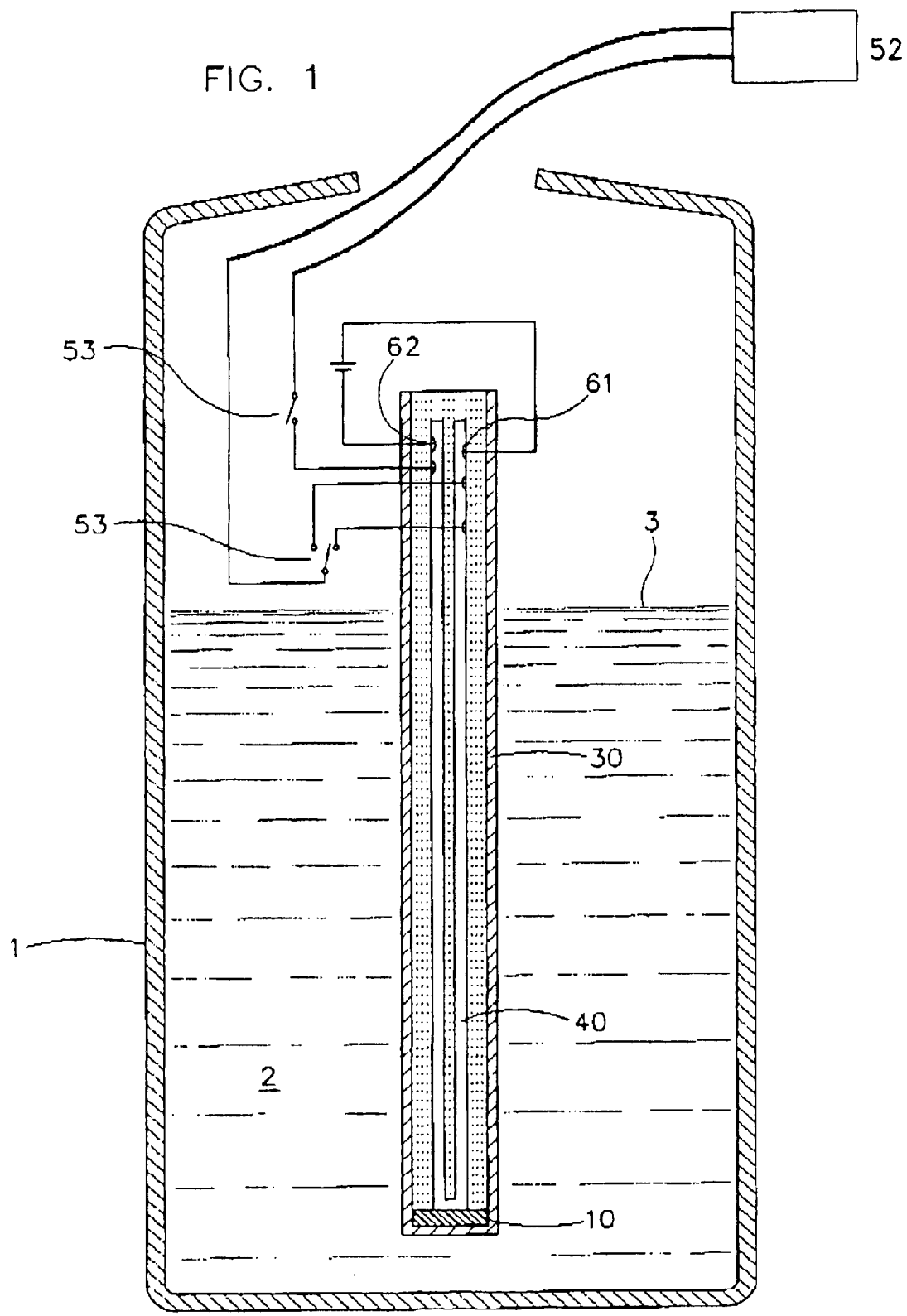
FIG. 1 is a schematic showing a liquid helium level sensor installed in a liquid helium reservoir.

Reference is now made to the drawings wherein like numbers represent like elements throughout. FIG. 1 is a schematic of the liquid helium level sensor of the present invention showing the cryostat 1, the cryogenic fluid 2, the liquid-gas interface 3, the filament 40 and the superconductive solder 10. Also shown in FIG. 1 is an electric current source 52, current switches 53 and positive and negative voltage terminals 61, 62.

Figure 2:
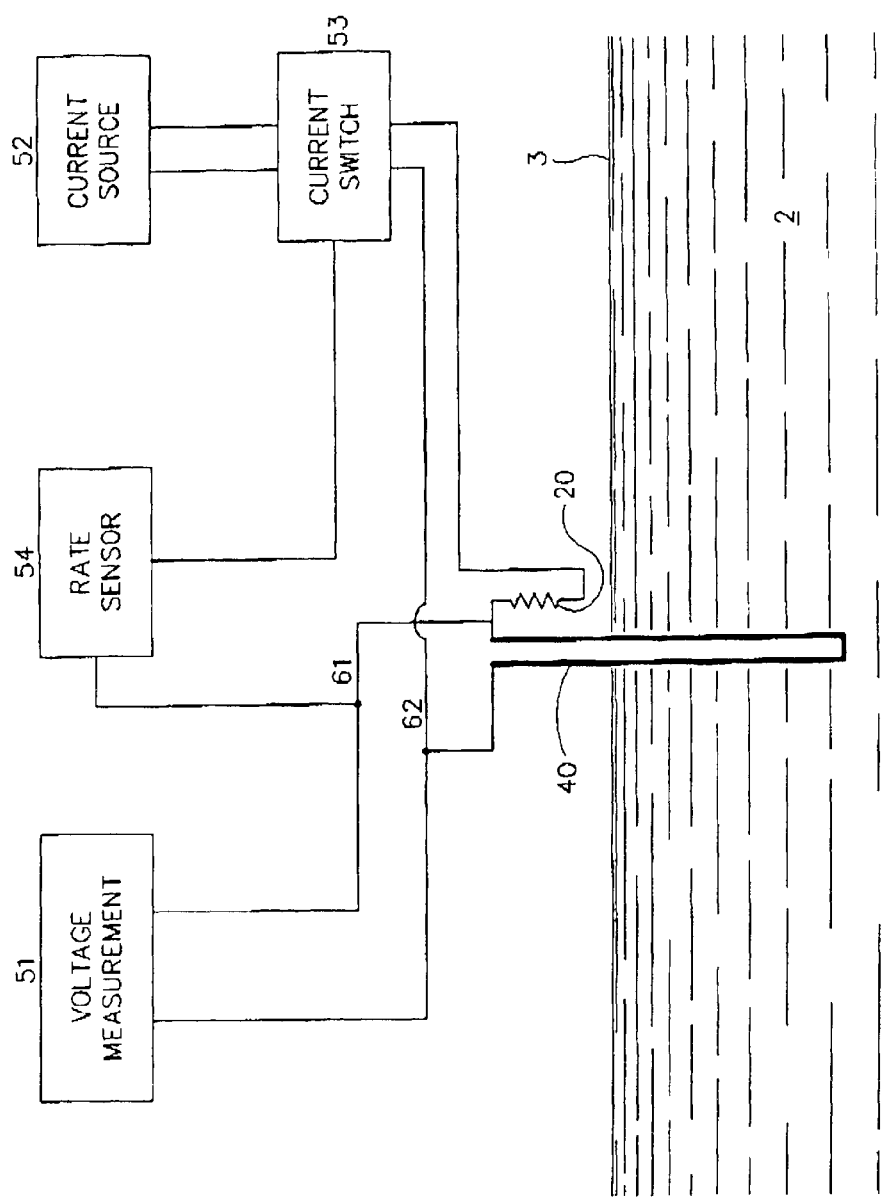
FIG. 2 is a block diagram of the circuitry of a liquid helium level sensor.

FIG. 2 is a schematic block diagram of a voltage measurement device 51, a rate sensor 54, a current source 52, and a current switch 53. As shown, the current source 52 is connected to the filament 40 and heater 20 through the current switch 53. A voltmeter 61 is then connected to measure the voltage drop across the length of the filament 40. The voltmeter measures the voltage drop at voltage terminals 61, 62.

In normal operation of this general embodiment of this invention, the filament 40 and heaters 20 are placed within a rigid or flexible tube 30 and lowered into the cryostat 1 until at least a portion of the filament 40 is submerged. As discussed above, the extremely low temperature of the liquid phase of the helium 2 makes the filament 40 a superconductor.

Current from the current source 52 is then applied through the switch 53 to the heater 20 and filament 40. Normally, between 50 and 200 mAmps are used. Initially, there will be no voltage drop generated through the filament 40 because it is all superconducting. However, as the heater 20 heats the filament 40, it will produce a region of normal resistance in the filament 40, and thus a measurable voltage drop across voltage terminals 61, 62. In general, it takes between 0.1–1 second to warm that portion of the filament 40 situated above the liquid helium 2 to the point that it provides some measurable electrical resistance. The heat from the heater 20 will progress down the filament 40 to the gas-liquid interface 3, at which point it ceases to have an effect on the filament 40. Thus, that portion of the filament 40 situated above the gas-liquid interface 3 will offer normal electrical resistance while that below the gas-liquid interface 3 will be superconductive. In general, the resistance offered by the filament 40 above the superconducting portion will produce a voltage drop of up to approximately 50 volts.

The voltage drop across the filament 40 increases in a generally linear manner, the rate of change being dV/dt. As the gas-liquid interface 3 is approached, the voltage becomes constant, or the rate of increase of voltage changes until dV/dt=0 as the normal resistive state of the filament 40 has reached the gas-liquid interface 3.

At a low value of dV/dt, the rate sensor 54 causes the switch 53 to open. Current then stops flowing through the filament 40 and the heater 20. Therefore, current only flows during the time necessary to warm the filament 40 above the gas-liquid interface 3. This minimizes the evaporation of liquid helium 2 due to heat added while measuring the level of the liquid helium 2. The current could also be cycled to reduce liquid helium 2 evaporation.

The present invention uses a combination of superconducting filament 40 and heater 20 to improve accuracy and sensitivity in liquid helium 2 level measurement. The present invention also employs a thicker NbTi filament 40 connected in series to increase the output voltage. The NbTi filament 40 used will range between 0.001 in. and 0.005 in. Use of a thicker filament increases the sensitivity to changes in helium level and increases the accuracy of measurement. This new and unique invention provides for higher sensitivity to changes in the liquid helium 2 level because the present invention provides for a longer resistive region. Further, the amount of voltage drop increases linearly with the amount of resistance. Therefore, the greater the voltage drop, the more easily it is measured, and thus, the more accurately it is measured. Additionally, the filament 40 used in the present invention can be thicker than what is presently used. The filament 40 used in the present invention is more reliable and less subject to breakage. Thicker filaments 40 are far easier to manufacture than filaments 40 that are presently being used. The filament 40 employed is common commercial NbTi filament of approximately 46% to 48% titanium by weight.

The present invention also provides for the ability to use a multifold superconducting filament 40 in the level sensor in contrast to a conventional, single filament 40. Multifold configurations generally consist of filament 40 connected using a superconductive solder 10. A multifold configuration, as further provided for in this disclosure will increase the sensor accuracy by a factor of two, as illustrated in FIG. 3, or by a factor of four, as shown in FIG. 4. Obviously, the concept can be extended to as many folds as are required to further enhance accuracy.

FIG. 3 shows a two length filament 140 wherein the filament 140 is comprised of a first length 141 having a first end 241 connected to the voltage terminal 161 and a second end 242 and a second length 142 having first end 243 connected to the second end 242 of the first length 141 and a second end 244 connected to a voltage terminal 162. FIG. 4 illustrates an example of the use of four lengths 341, 342, 343, 344 of superconducting filament 340 wherein the superconducting filament 340 is comprised of a first length of superconducting filament 341 having a first end 441 connected to the voltage terminal 361 and a second end 442, a second length of the superconducting filament 342 having first end 443 connected to the second end of the first length 442 and a second end 444, a third length of superconducting filament 343 having a first end 445 connected to the second end 444 of the second length 342, and a fourth length of superconducting filament 344 having a first end 447 connected to the second end of the third length 446 and a second end 448 connected to a second voltage terminal 362.

Accordingly, an improved device for measuring the level of liquid helium 3 in a cryogenic environment has been disclosed. The device of the present invention a longer and thicker filament 40 that provides a greater measurable voltage drop and thus a more accurate measurement of the level of liquid helium 2 present in the cryostat. Further, a thicker filament 40 improves performance and is less complicated to produce than the thinner filaments 40 of the prior art.

FIG. 3 shows an embodiment in which current would enter the cryostat 1 at 63 and leave at 64. The voltage drop would be measured at voltage terminals 61 and 62. FIG. 4 is identical with the exception of the increased filament 40 length.

Although we have very specifically described the preferred embodiments of the invention herein, it is to be understood that changes can be made to the improvements disclosed without departing from the scope of the invention. Therefore, it is to be understood that the scope of the invention is not to be overly limited by the specification and the drawings, but is to be determined by the broadest possible interpretation of the claims.

PARTS LIST

1 cryostat
2 liquid cryogen
3 interface between liquid and gas phase
10 connector and epoxy
20 heater
30 flexible or rigid tubing
40 filament
51 voltmeter
52 current source
53 current switch
54 rate sensor
61 positive voltage terminal
62 negative voltage terminal
63 positive current source
64 negative current source
140 two length filament
141 first length of filament 140
142 second length of filament 140
161 voltage terminal
162 voltage terminal
241 first end of 141
242 second end of 141
243 first end of 142
244 second end of 142
340 four length filament
341 first length of filament 340
342 second length of filament 340
343 third length of filament 340
344 fourth length of filament 340
361 voltage terminal
362 voltage terminal
441 first end of 341
442 second end of 341
443 first end of 342
444 second end of 342
445 first end of 343
446 second end of 343
447 first end of 344
448 second end of 344

What is claimed is:

1. A liquid level indicator for cryogenic liquids comprising a filament having a first length having a first end connected to the means for measuring the voltage drop and a second end, and a second length having first end connected to the second end of the first length and a second end connected to the means for measuring voltage that is capable of super conduction at cryogenic temperatures, a means for measuring the voltage drop across the filament, a current source connected to the filament, and a switch between the current source and the filament alternately permitting and halting the flow of electric current through the filament.

2. The liquid level indicator of claim 1 wherein the filament is further comprised of
a third length of filament having a first end connected to the second end of the second length and a second end, and
a fourth length of filament having a first end connected to the second end of the third length and a second end connected to a means for measuring voltage.

3. A liquid level indicator for cryogenic liquids in a cryostat comprising
a filament that is capable of super conduction at cryogenic temperatures having a first end, an integrally formed resistance heater coil, and a second end, the filament having one fold at the bottom of the cryostat such that length of filament in the cryostat is doubled,
a first terminal at the first end of the filament,
a second terminal at the second end of the filament,
a voltmeter connected to the first and second terminals that measures the voltage across the first and second terminals,
an electric current source connected to the filament,
a switch between the current source and the filament alternately permitting and halting the flow of electricity through the filament, and
a sensing means connected to the filament, said sensing means being responsive to the normal resistive state of the filament wherein a detection of measurable resistance with the filament by the sensing means causes the switch to close.

4. The liquid level indicator of claim 3 wherein the liquid level indicator is enclosed within a rigid or a flexible tube.

5. The liquid level indicator of claim 4 wherein the filament has three folds and bath ends of the filament are connected to terminals wherein the voltage drop across a portion of the filament can be measured.

6. The liquid level indicator of claim 5 wherein the filament has a plurality of folds and both ends of the filament are connected to terminals is wherein the voltage drop across a portion of the filament can be measured and the cryogenic liquid level detector provides a constant value of current.

7. A cryogenic liquid level detector system comprised of
a superconducting filament having an integrally formed resistance heater coil, said superconducting filament having a first length having a first end end a second end and a second length having a first end and a second end, said first end being connected to the second end of the first length
a first terminal at the first end of the first length of the superconducting filament,
a second terminal at the second end of the second length of the superconducting filament,
a voltmeter connected to the first and second terminals, said voltmeter measuring the voltage across the first and second terminals,
an electric current source connected to the superconducting filament,
a switch between the current source and the superconductor filament alternately permitting and halting the flow of electricity through the filament, and
a sensing means connected to the filament, said sensing means being responsive to the normal resistive state of the filament, said sensing means further causing a signal to close the switch.

8. The liquid level indicator of claim 7 wherein the filament is enclosed within a rigid or flexible tube having an open end and a closed end.

9. The liquid level indicator of claim 8 wherein the superconducting filament is comprised of
a third length of superconducting filament having a first end connected to the second end of the second length and a second end, and
a fourth length of superconducting filament having a first end connected to the second end of the third length and a second end connected to a second voltage terminal.

10. The liquid level indicator of claim 8 wherein a plurality of superconducting filaments are conductively connected such that current flows through the plurality of filaments and a voltage drop can be measured across said plurality of filaments.

11. The liquid level indicator of claim 10 wherein each of the filament connections are made using superconductive solder.

12. The liquid level indicator of claim 11 wherein the current source for the cryogenic liquid level detector provides a constant value of current.

13. A method for assembling a cryogenic liquid level detector system comprising the steps of
providing a superconducting filament having an integrally formed resistance heater coil said superconducting filament having a first length of superconducting filament having a first end and a second end, and a second length of superconducting filament having first end connected to the second end of the first length and a second end,
providing a first terminal at the first end of the superconducting filament,
providing a second terminal at the second end of the superconducting filament,
providing a voltmeter connected to the first and second terminals, said voltmeter measuring the voltage across the first and second terminals,
providing an electric current source connected to the superconductor filament,
providing a switch between the current source and the superconductor filament alternately permitting and halting the flow of electricity through the filament, and
providing a sensing means connected to the filament, said sensing means being responsive to the normal resistive state of the filament, said sensing means further causing a signal to close the switch.

14. The method of claim 13 including the step of providing
a third length of superconducting filament having a first end connected to the second end of the second length and a second end, and
a fourth length of superconducting filament having a first end connected to the second end of third length and a second end connected to a second voltage terminal.

15. The method of claim 14 wherein the cryogenic liquid level detector provides a constant value of current.

16. A method for using a liquid cryogen level sensor comprising the steps of
partially immersing a plurality of lengths of conductive filament such that said lengths of filament are joined end-to-end within a liquid cryogen, said lengths being oriented generally vertically such that said lengths each have a portion immersed in the liquid cryogen and a portion which is not immersed in the liquid cyrogen,
passing an electric current through the filament,
heating that part of the filament that is not immersed, and measuring the voltage drop across that portion of the filament that is not submerged.

17. The method of claim 16 wherein the portion of the filament that is immersed in the liquid cryogen is rendered superconductive and the portion that is not immersed provides a measurable voltage drop.

18. The method of claim 17 wherein a voltage measuring device is provided for measuring the voltage drop across the filament.

19. The method of claim 18 wherein the resistance across the filament is calculated using the voltage drop and the current supplied and this resistance is correlated with a liquid helium level.

20. The method of claim 19 wherein each of said lengths of filament are connected end-to-end using a superconductive solder.

* * * * *

UNITED STATES PATENT AND TRADEMARK OFFICE
CERTIFICATE OF CORRECTION

PATENT NO. : 6,925,873 B2
DATED : August 9, 2005
INVENTOR(S) : Minfeng Xu et al.

It is certified that error appears in the above-identified patent and that said Letters Patent is hereby corrected as shown below:

Column 5,
Line 33, the word "bath" should be replaced with the word -- both --.
Line 44, the second instance of the word "end" should be replaced with the word -- and --.

Signed and Sealed this

Eleventh Day of October, 2005

JON W. DUDAS
*Director of the United States Patent and Trademark Office*